US009085920B2

(12) United States Patent
Marshall et al.

(10) Patent No.: US 9,085,920 B2
(45) Date of Patent: Jul. 21, 2015

(54) SECURITY APPARATUS WITH BLOCKING ELEMENT

(71) Applicant: ACCO Brands Corporation, Lake Zurich, IL (US)

(72) Inventors: Barry Marshall, Santa Clara, CA (US); Dominic Peralta, San Mateo, CA (US); Andy Church, Oakland, CA (US); Jon Corpuz, Fremont, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 156 days.

(21) Appl. No.: 13/941,642

(22) Filed: Jul. 15, 2013

(65) Prior Publication Data

US 2014/0013809 A1 Jan. 16, 2014

Related U.S. Application Data

(60) Provisional application No. 61/671,519, filed on Jul. 13, 2012.

(51) Int. Cl.
*G06F 1/16* (2006.01)
*E05B 73/00* (2006.01)

(52) U.S. Cl.
CPC ............ *E05B 73/0082* (2013.01); *Y10T 70/40* (2015.04); *Y10T 70/409* (2015.04)

(58) Field of Classification Search
USPC ........... 345/168, 169, 156, 172, 1.1, 1.3, 419, 345/633, 175, 179; 361/679.12, 679.17, 361/679.08, 679.01, 679.16, 679.09, 361/679.55, 679.56, 679.3, 679.27, 679.06, 361/679.4, 679.2, 679.26, 679.29, 679.14; 248/126, 917, 918, 276.1; 16/308, 366, 16/342, 239, 258, 354; 455/550.1, 556.1, 455/575.3, 575.4, 556.2, 466, 410, 575.1; 312/322, 223.1, 223.2, 223.3
See application file for complete search history.

(56) References Cited

U.S. PATENT DOCUMENTS

| | | | | |
|---|---|---|---|---|
| 3,895,768 | A | 7/1975 | Scheck | |
| 7,997,106 | B2 | 8/2011 | Mahaffey et al. | |
| 8,640,509 | B2 * | 2/2014 | Will | 70/57.1 |
| 2011/0283751 | A1 | 11/2011 | Avganim | |
| 2012/0268878 | A1 * | 10/2012 | Smith | 361/679.08 |

OTHER PUBLICATIONS

International Search Report dated Dec. 5, 2013 for International Appl. No. PCT/US2013/050457, 9 pages.
Written Opinion dated Dec. 5, 2013 for International Appl. No. PCT/US2013/050457, 4 pages.

* cited by examiner

*Primary Examiner* — Hung Duong
(74) *Attorney, Agent, or Firm* — Michael Best & Friedrich LLP

(57) ABSTRACT

A security apparatus for securing a portable device includes a shell configured to surround at least a portion of the portable device, an attachment device coupled to the shell, and a blocking element defining a clearance aperture. The blocking element is movably coupled to the shell for movement between a first position, in which the portable device is removable from the shell, and a second position, in which the portable device is secured within the shell. The attachment device extends through the clearance aperture of the blocking element when the blocking element is in the second position.

20 Claims, 6 Drawing Sheets

SECURITY APPARATUS WITH BLOCKING ELEMENT

CROSS-REFERENCE TO RELATED APPLICATIONS

This application claims priority to U.S. Provisional Patent Application No. 61/671,519, filed Jul. 13, 2012, the entire contents of which are incorporated by reference herein.

BACKGROUND

Embodiments of the present invention relate to devices for inhibiting the theft of relatively small but expensive pieces of equipment, such as laptops, iPads™, iPhones™, similar mobile computing devices, tablets, or electronic devices without a security slot (e.g., a Kensington™ security slot).

As thinner and slimmer portable electronic devices (e.g., 11 inch and 13 inch Apple™ MacBook Air™ laptop computers, DELL™ XPS™ laptop computers, etc.) are developed, the form factors of the thinner devices do not allow typical physical security devices (e.g., locks) designed for a larger form factor to be used. The thinner form factors and bodies of the thinner computers do not provide opportunities for attachment points that are typically required for use in conjunction with security cable lock products without the use of permanent adhesive based attachment methodologies. However, permanent adhesive based attachment methodologies can require more maintenance, be less secure, less portable, and less stylish than cable lock methodologies.

Furthermore, consumers purchase these slimmer portable electronic devices (e.g. computers) so that they can gain the advantage of their low profile, ultra-slim, sculpted enclosure form factors that are lighter, more mobile, accessible, and sleek. Accordingly, consumers do not want to compromise the advantages of their low profile, ultra-slim, sculpted enclosure form factors with bulky attachment means.

SUMMARY

In one embodiment, the invention provides a security apparatus for securing a portable device. The security apparatus includes a shell configured to surround at least a portion of the portable device, an attachment device coupled to the shell, and a blocking element defining a clearance aperture. The blocking element is movably coupled to the shell for movement between a first position, in which the portable device is removable from the shell, and a second position, in which the portable device is secured within the shell. The attachment device extends through the clearance aperture of the blocking element when the blocking element is in the second position.

In another embodiment, the invention provides a security system including a portable device, a shell surrounding at least a portion of the portable device, an attachment device coupled to the shell, and a blocking element defining a clearance aperture. The blocking element is movably coupled to the shell for movement between a first position, in which the portable device is removable from the shell, and a second position, in which the portable device is secured within the shell. The security system further includes a locking device selectively secured to the attachment device. When the blocking element is in the second position, the attachment device extends through the clearance aperture of the blocking element and the locking device engages the attachment device to secure the blocking element in the second position.

Other aspects of the invention will become apparent by consideration of the detailed description and accompanying drawings

DETAILED DESCRIPTION OF THE INVENTION

Embodiments of the present invention are directed to security apparatuses for ultra thin portable electronic devices, methods for making and using such security apparatuses, and systems using such security apparatuses. The security apparatuses can be used to prevent or deter the theft of devices such as portable electronic devices.

Figure 1:
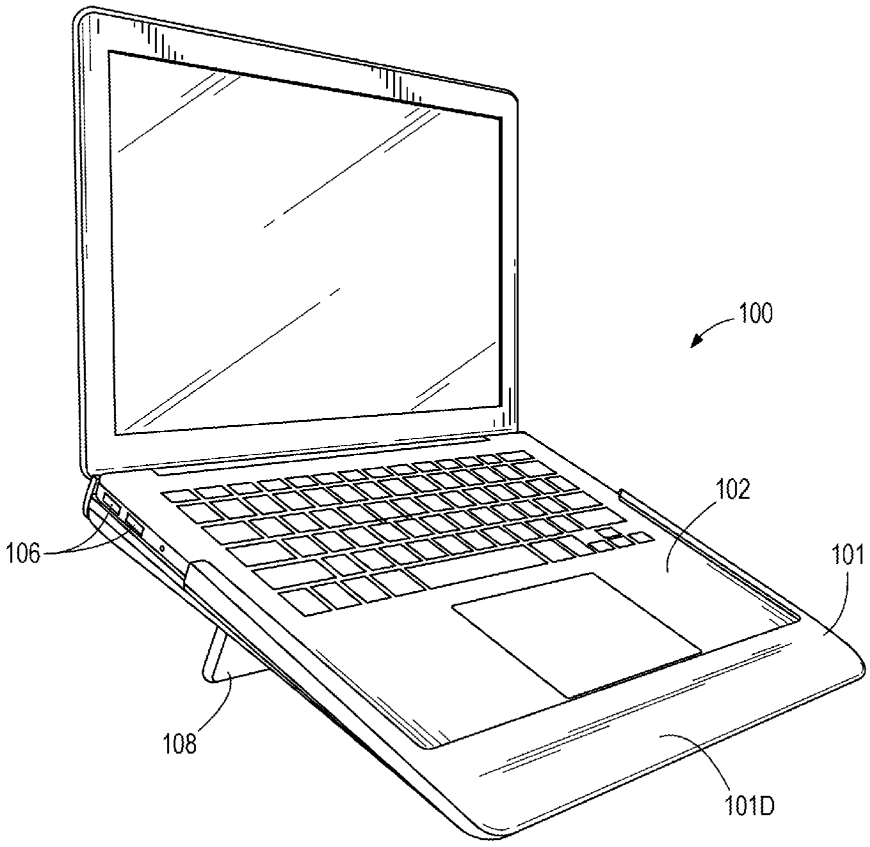
FIG. 1 is a front perspective view of a security apparatus engaged with a portable electronic device.
Figure 2:
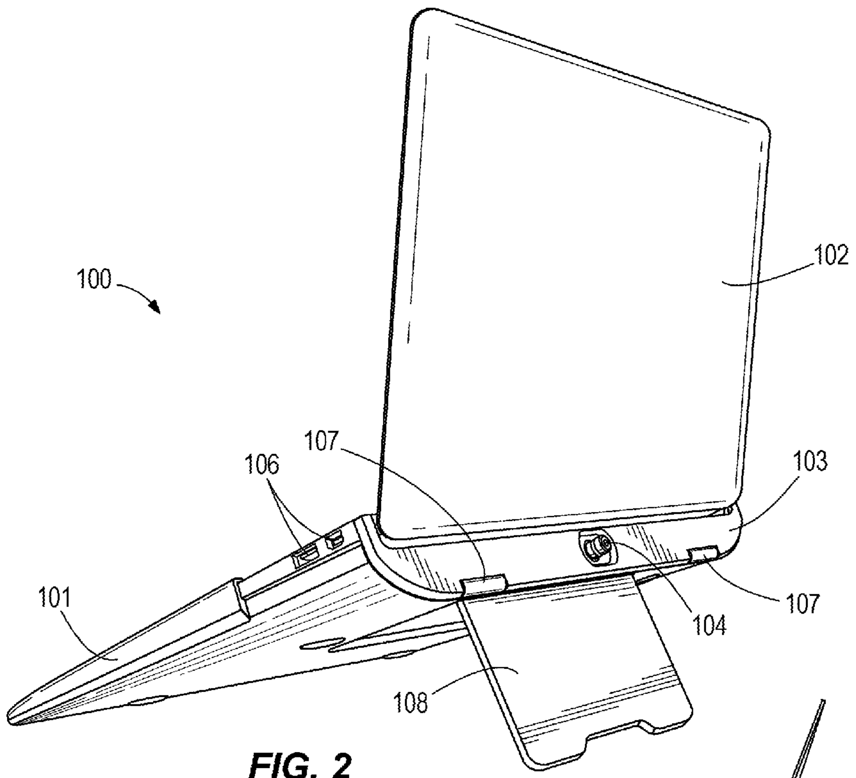
FIG. 2 is a rear perspective view of the security apparatus engaged with the portable electronic device.
Figure 3:
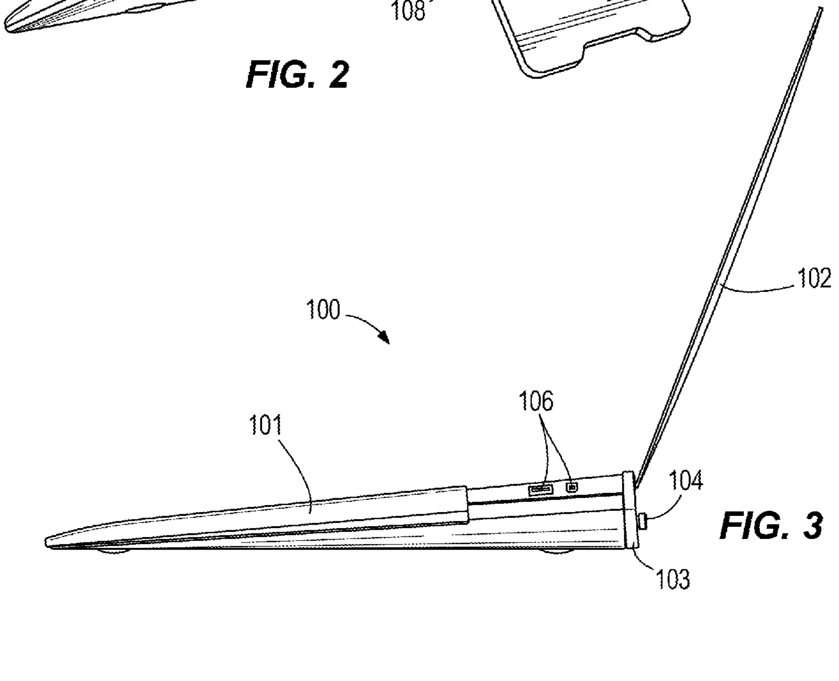
FIG. 3 is a side view of the security apparatus engaged with the portable electronic device.

FIGS. 1-3 illustrate an exemplary embodiment of a security apparatus 100 engaged with a portable device 102. The security apparatus 100 comprises a shell 101, an attachment device 104, and a blocking element 103.

The portable device 102 is preferably a portable electronic device (i.e., portable consumer device). Examples of portable electronic devices include Apple™ 13 inch and 11 inch MacBook Air™ laptop computers. Although the security apparatus 100 shown in FIGS. 1-3 is configured to fit an Apple™ Macbook Air™, the shell 101 and the blocking element 103 could be designed to conform with any portable electronic device 102.

The shell 101 may be an injection molded plastic sleeve or glove which enables a user to slide their portable electronic device 102 into the sleeve or glove in a single motion, thereby securing the keyboard or lower portion of the portable electronic device 102 beneath the retaining walls of the molded housing along three edges; including the left, right and bottom sides. The shell 101 may be configured such that when fully engaged with the portable electronic device 102, input and output connectors 106 of the portable electronic device 102 may be accessed by the user.

The security apparatus also comprises an attachment device 104 (e.g. a Kensington™ ClickSafe™ formed mounting spur) coupled to the shell. As shown in FIG. 2, the attachment device 104 may be coupled such that the attachment device 104 is centrally located along the rear surface of the shell 101. The attachment device 104 may be made of metal or a similar hard and strong material such that the attachment device 104 may not easily be broken, deformed, or separated from the shell 101. The attachment device 104 may be coupled to the shell in any suitable manner, including being held in place by a front and back portion of the shell 101. Alternatively, the attachment device 104 may be coupled to the shell 101 when the shell is formed.

The blocking element 103 may be a formed metal bar (or other strong and hard material) which may be physically coupled to the shell 101 by one or more hinge assemblies 107. The hinge assemblies 107 allow the blocking element 103 to rotate or pivot at least 90 degrees relative to the shell 101 such that the blocking element 103 may be in an open or closed position with respect to the rear surface of the shell 101. When in the open position (FIGS. 4 and 5), the portable electronic device 102 is only secured by the retaining walls of the shell 101 and may be removed from the security apparatus 100. The attachment device 104 may be located such that a portable electronic device 102 may be removed from the shell 101 when the blocking element 103 is in the open position and is not engaged with the attachment device 104. When rotated to the closed position (FIGS. 6 and 7), the blocking element 103 is rotated at least 90 degrees towards the portable electronic device 102 to enclose the portable electronic device 102 by providing a back wall to the shell 101. Thus, all sides of the portable electronic device 102 may be securably surrounded by the security apparatus 100.

Figure 4:
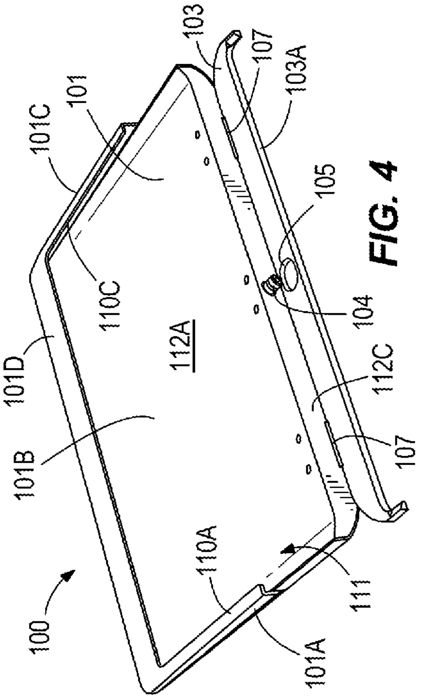
FIG. 4 is a top perspective view of the security apparatus with a blocking element in an open position.
Figure 5:
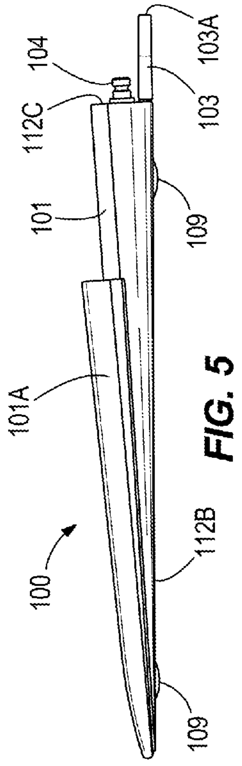
FIG. 5 is a side view of the security apparatus with the blocking element in the open position.
Figure 6:
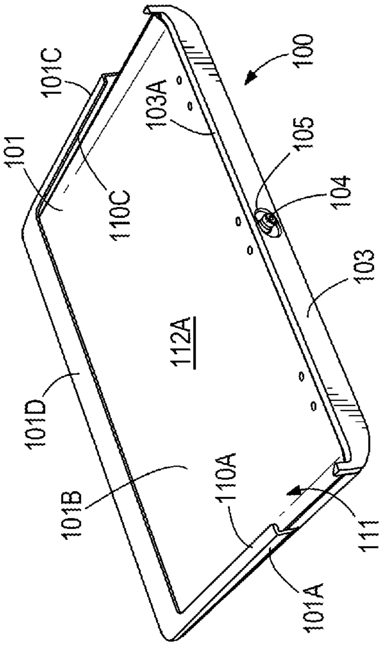
FIG. 6 is a top perspective view of the security apparatus with the blocking element in a closed position.

The open and closed positions of the blocking element 103 are shown in reference to FIGS. 4-7. As shown in FIG. 4, the blocking element 103 defines a clearance aperture 105 (e.g., a hole) that aligns with the attachment device 104 such that when the blocking element 105 is rotated into the fully closed position (as shown in FIG. 6), the attachment device 104 extends through the clearance aperture 105. Examples of apertures can be holes, closed slots, open slots, or any other configuration that allows the attachment element to extend through or around the blocking element partially or in its entirety. Accordingly, the attachment device 104 extends past the blocking element 103 and provides a secure attachment point to which a locking device can be "snapped" into position by grasping the attachment device 104. In some embodiments, the locking device may include a locking head 120 (e.g. a Kensington™ ClickSafe™ lock (FIG. 8)), a cable, a padlock, or the like configured to engage the attachment device 104.

The clearance aperture 105 is just large enough to allow the attachment device 104 to extend through the clearance aperture 105. Once the locking head 120 (or other locking device) is engaged with the attachment device 104, the blocking element 103 may not be rotated to the open position (as shown in FIG. 4) because the locking head 120 is too big to pass through the clearance aperture 105 (i.e. at least a portion of the locking head 120 has an outer perimeter that is larger than an inner perimeter of the blocking element 103 that defines the clearance aperture 105). Accordingly, the locking head 120 will constrain the movement of the blocking element 103. As such, the blocking element 103 prevents the opening and removal of the portable device 102 from within the now locked "glovelike" security apparatus 100 without first using a key or entering a combination to open and remove the now attached locking head 120.

If the locking head 120 is unlocked and disengaged with the attachment device 104, the blocking element 103 may be rotated away from the portable device 102 and the clearance aperture 105 may again clear the attachment device 104 and allow the blocking element 103 to move to an open position. Accordingly, the user may once again gain access to and remove the portable electronic device 102 from the shell 101.

Returning to FIG. 2, the security apparatus 100 may also include a card stand 108. FIG. 2 shows a rear perspective view of an exemplary embodiment of the security apparatus engaged with the portable electronic device 102 with the card stand 108 engaged or extended. The card stand 108 may be formed of the same material as the shell 101 or may be formed of any suitable material that is strong enough to bear the weight of the portable electronic device 102. The card stand 108 may be coupled to the bottom of the shell 101 through a hinged assembly such that when fully opened and engaged, the card stand 108 may provide a preferred alternative angle of inclination for the portable electronic device 102. This alternative angle of inclination can enhance a user's experience during extended periods of typing on the device's 102 keyboard or may elevate the viewing location of the screen of the portable electronic device 102 with respect to the desktop. The card stand 108 may have any suitable shape and may be stored in a similarly shaped section on the bottom of the shell 101 when not engaged.

FIG. 4 shows a rear elevated view of an exemplary embodiment of the security apparatus 100 with the blocking element 103 in the open position. The shell 101 comprises a left elevated portion 101A, a right elevated portion 101C, and a bottom or base portion 101B that connects the left elevated portion 101A and the right elevated portion 101C. The left elevated portion 101A, the right elevated portion 101C, and the bottom portion 101B may be configured to securably surround at least a portion of any portable electronic device 102. In particular, the left and right elevated portions 101A, 101C are spaced apart from each other so that the elevated portions 101A, 101C are positioned adjacent opposing sides of a lower portion (e.g., a keyboard portion) of the portable device 102 and surround at least three sides of the device 102 (as shown in FIGS. 1-2).

Each elevated portion 101A, 101C includes a flange 110A, 110C. The flanges 110A, 110C extend toward each other generally parallel to the bottom portion 101B. The flanges 110A, 110C are configured to extend over a portion of the lower portion of the portable device 102 (as shown in FIG. 1) to inhibit the device 102 from being lifted away from the bottom portion 101B. The left elevated portion 101A, the bottom portion 101B, and the right elevated portion 10C thereby form a pocket 111 configured to receive the lower portion of the portable device 102.

The shell 101 may also include a palm/wrist rest 101D below the keyboard of the portable electronic device 102 to provide an ergonomic surface for typing (as shown in FIG. 1). The wrist rest 101D extends between the elevated portions 101A, 101C of the shell 101 at generally the same height or elevation as the flanges 110A, 110C, giving the shell 101 a continuous and sculpted appearance.

The bottom or base portion 101B of the shell 101 includes an upper surface 112A (FIGS. 4 and 6), a lower surface 112B (FIGS. 5 and 7) opposite the upper surface 112A, and a back surface 112C (FIGS. 4 and 5) extending between the upper and lower surfaces 112A, 112B opposite the wrist rest 101D. The upper surface 112A is configured to engage and support the portable device 102. The attachment device 104 extends generally perpendicularly from the back surface 112C. As shown in FIG. 6, when the blocking element 103 is in the closed position, an upper edge 103A of the blocking element 103 is positioned above the upper surface 112A of the shell 101 to inhibit the portable device 102 from being slid out of the shell 101.

As shown in FIG. 4, the two hinge assemblies 107 are coupled to the shell 101 at the intersection of the lower surface 112B and the back surface 112C. The hinge assemblies 107 are also coupled to the blocking element 103 to pivotally couple the blocking element 103 to the shell 101. The blocking element 103 is thereby pivotally movable relative to the shell 101 between the open and closed positions.

Figure 7:
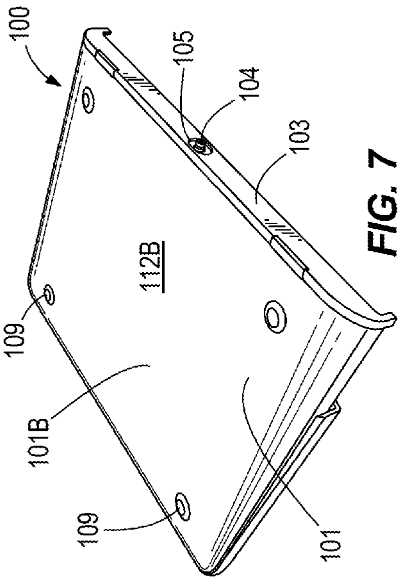
FIG. 7 is a bottom perspective view of the security apparatus with the blocking element in the closed position.

As shown in FIGS. 5 and 7, the lower surface 112B of the shell 101 may include rubber feet 109 or a secondary material of any type providing a raised surface that provides resistance such that the shell 101 does not slip on a surface it is placed upon.

Figure 8:
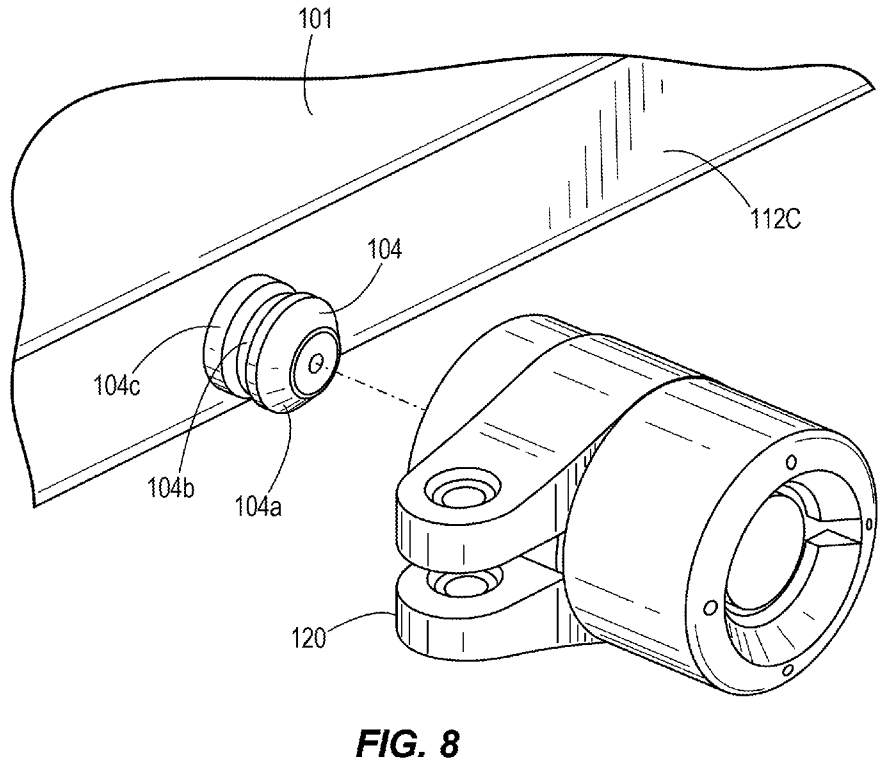
FIG. 8 is an exploded perspective view of a locking device and a portion of the security apparatus.

FIG. 8 shows the attachment device 104 and the locking head 120 according to an exemplary embodiment of the present invention. The illustrated attachment device 104 is a boss or projection extending from the back surface 112C of the shell 101. To permit engagement with the locking head 120, the attachment device 104 may include, e.g., a recess, such as a recess 104*b* defined by a cap 104*a* and a ring structure 104*c*. The cap 104*a* and the ring structure 104*c* may have similar diameters. In some implementations, the cap 104*a* and the ring structure 104*c* may each comprise cylinders with a substantially (axially) tapered end and a substantially flat end opposite the substantially tapered end. In other implementations, one or more ends of the cap 104*a* or the ring structure 104*c* may comprise a curved surface or other uneven shape (i.e., not flat). The lateral side wall of each of the ring structure 104*c* and the cap 104*a* may be tapered (as in a cone shape) or may comprise a straight wall. In other embodiments, the attachment device 104 may include a channel or bore configured to receive a cable or padlock.

Figure 9:
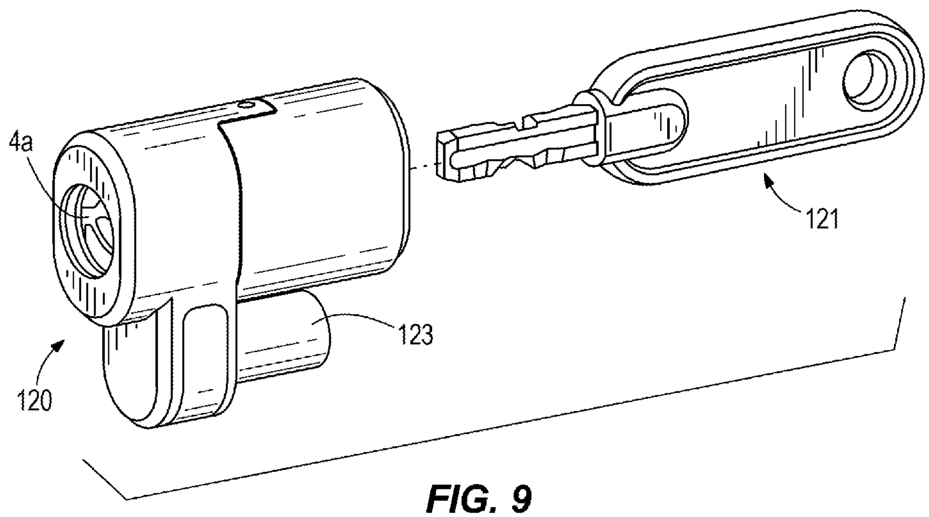
FIG. 9 is an exploded perspective view of the locking device including a locking head and a key.
Figure 10:
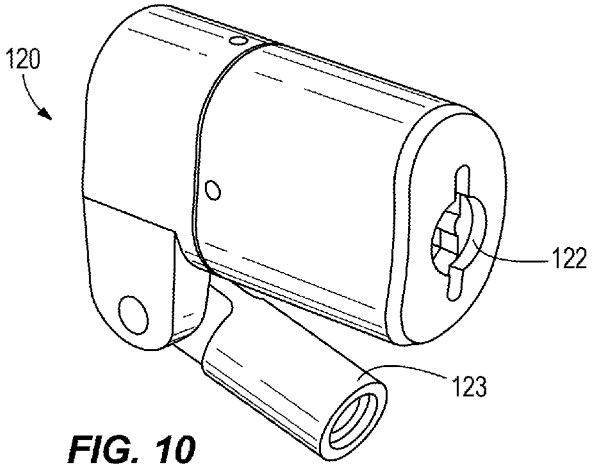
FIG. 10 is a perspective view of the locking head.

FIG. 9 shows an exploded view of another exemplary locking head 120 and key 121. A front hole 4*a* in the locking head 120 may be configured to receive the cap 104*a* in the attachment device 104 (FIG. 8). The locking head 120 may include any suitable dimensions, e.g., having a length, height and/or width of about 5-50 mm. The illustrated locking head 120 also includes a coupler 123 that receives a portion of a cable to secure the locking head 120 to an immovable object (e.g. a desk, a wall, etc.). FIG. 10 shows a rear perspective view of the locking head 120. A keyhole 122 is at a rear section of the locking head 120. Locking heads and/or keys varying in design and/or operation from that described above may be used, such as those described in U.S. application Ser. No. 12/969,401, now U.S. Pat. No. 7,997,106, which is fully incorporated by reference herein.

Figure 11:
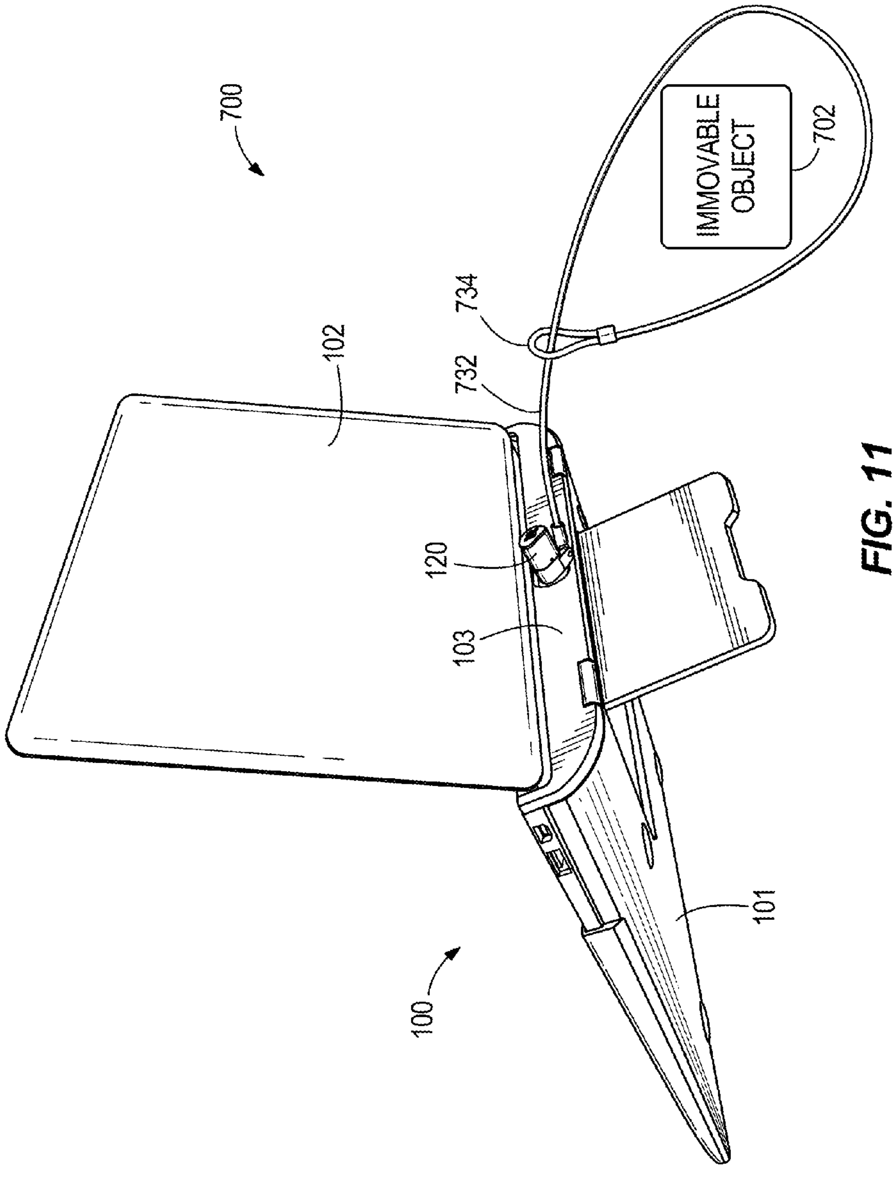
FIG. 11 is a perspective view of a security system including the portable electronic device and the security apparatus.

FIG. 11 illustrates a security system 700 including the security apparatus 100, the portable device 102, and an immovable object 702. The locking head 120 is coupled to a cable 732, which is tethered to a permanent or semi-permanent immovable object 702. The cable 732 includes a loop 734 formed at one end such that the cable 732 can be threaded through itself around the immovable object 702. In some embodiments, the immovable object 702 may be a desk, table, chair, wall, pipe, strut, hook, or other object within an office, home, store, or other location where the portable device 102 is located.

Embodiments of the present invention provide a number of advantages including providing a low profile, ultra-slim footprint protective lower case that enables a user to support mobile physical security for an otherwise unsecurable form factor without the use of permanent adhesive additions. Additionally, the low profile, minimalist design of some embodiments of the present invention support full viewing of the portable electronic device's attractive industrial design elements and logo placement without compromising security. Furthermore, embodiments of the present invention provide a user with means to secure portable electronic devices with a fast and secure cable lock assembly, engaged with a single "click" supporting both key and combination locks. Embodiments of the present invention also provide a healthier interaction with the user through additional ergonomic palm and wrist rests along the bottommost edge of enclosure to enhance user experience of portable electronic devices as well as providing an ergonomically superior angle of inclination to elevate the screen viewing location relative to the desktop. Finally, the minimalist, low profile, and ultra-slim footprint protective case is also a "portable" or readily mobile security case product solution that supports the inherent mobility of the portable electronic device.

Embodiments of the present invention also allow mobility with a dock or by allowing a user to quickly and easily remove the shell. The security apparatus also provides deterrent security by deterring potential thieves through the secured look and feel of the device. Additionally, the present invention may be used with many different types of locks including Kensington™ ClickSafe™ Combo and Keyed locks.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A security apparatus for securing a portable device, the security apparatus comprising:

a shell configured to surround at least a portion of the portable device;

an attachment device fixed to the shell; and a blocking element defining a clearance aperture, the blocking element being movably coupled to the shell for movement relative to the attachment device between a first position, in which the portable device is removable from the shell, and a second position, in which the portable device is secured within the shell;

wherein the attachment device extends through the clearance aperture of the blocking element when the blocking element is in the second position.

2. The security apparatus of claim 1, further comprising a locking device that is selectively securable to the attachment device, wherein the locking device locks the blocking element in the second position.

3. The security apparatus of claim 2, wherein the locking device has an outer perimeter, and wherein the outer perimeter of a portion of the locking device is larger than an inner perimeter of the blocking element that defines the clearance aperture.

4. The security apparatus of claim 2, wherein the locking device includes at least one of a locking head and a cable.

5. The security apparatus of claim 1, wherein the shell includes a base portion configured to support the portable device, a first elevated portion extending from the base portion, and a second elevated portion spaced apart from the first elevated portion and extending from the base portion, wherein the first and second elevated portions are configured to be positioned adjacent opposing sides of the portable device so that the shell surrounds at least three sides of the portable device.

6. The security apparatus of claim 5, wherein each of the first elevated portion and the second elevated portion includes a flange, wherein the flanges extend toward each other generally parallel to the base portion, and wherein each flange is configured to extend over a portion of the portable device.

7. The security apparatus of claim 6, wherein the base portion, the first elevated portion, and the second elevated portion form a pocket configured to receive the portable device.

8. The security apparatus of claim 1, wherein the shell includes an upper surface and a lower surface opposite the upper surface, wherein the upper surface is configured to engage the portable device.

9. The security apparatus of claim 8, wherein the shell further includes a back surface extending between the upper and lower surfaces, and wherein the attachment device extends from the back surface.

10. The security apparatus of claim 9, wherein the blocking element includes an upper edge, and wherein at least a portion of the upper edge is positioned above the upper surface of the shell when the blocking element is in the second position.

11. The security apparatus of claim 10, wherein the blocking element is pivotally coupled to the back surface of the shell at the lower surface.

12. The security apparatus of claim 1, further comprising a hinge assembly, wherein the hinge assembly pivotally couples the blocking element to the shell for pivotal movement between the first position and the second position.

13. A security system comprising:

a portable device;

a shell surrounding at least a portion of the portable device;

an attachment device fixed to the shell;

a blocking element defining a clearance aperture, the blocking element being movably coupled to the shell for movement relative to the attachment device between a first position, in which the portable device is removable from the shell, and a second position, in which the portable device is secured within the shell; and a locking device selectively secured to the attachment device;

wherein, when the blocking element is in the second position, the attachment device extends through the clearance aperture of the blocking element and the locking device engages the attachment device to secure the blocking element in the second position.

14. The security system of claim 13, wherein the locking device includes a locking head.

15. The security system of claim 14, wherein the locking device further includes a cable secured to the locking head, and wherein the cable is configured to be secured to an immovable object.

16. The security system of claim 13, wherein the shell includes a base portion that supports the portable device, a first elevated portion extending from the base portion, and a second elevated portion spaced apart from the first elevated portion and extending from the base portion, wherein the first and second elevated portions are positioned adjacent opposing sides of the portable device so that the shell surrounds at least three side of the portable device.

17. The security system of claim 13, wherein the shell includes an upper surface, a lower surface opposite the upper surface, and a back surface extending between the upper and lower surfaces, wherein the upper surface engages the portable device, and wherein the attachment device extends from the back surface.

18. The security system of claim 17, wherein the blocking element includes an upper edge, and wherein at least a portion of the upper edge is positioned above the upper surface of the shell when the blocking element is in the second position.

19. The security system of claim 13, further comprising a hinge assembly, wherein the hinge assembly pivotally couples the blocking element to the shell for pivotal movement between the first position and the second position.

20. The security system of claim 13, wherein the portable device is a laptop computer.

* * * * *